United States Patent [19]

Barnes

[11] Patent Number: 4,798,419
[45] Date of Patent: Jan. 17, 1989

[54] ANTI-JACKNIFING VALVE

[76] Inventor: William E. Barnes, 317 Pier A Naples Land Yacht Harbor, Naples, Fla. 33962

[21] Appl. No.: 78,580

[22] Filed: Jul. 27, 1987

[51] Int. Cl.⁴ .................................... B60T 13/00
[52] U.S. Cl. .................................... 303/7; 303/8; 303/14; 303/57
[58] Field of Search ............... 303/6 A, 6 C, 7, 8, 303/14, 47, 48, 57, 6.1, 6.01; 137/625.12, 118; 280/432

[56] References Cited

U.S. PATENT DOCUMENTS 1,957,891  5/1934  Kazenmaier ..................... 303/7
4,014,360  3/1977  Adams ........................... 137/118

Primary Examiner—Andres Kashnikow
Assistant Examiner—Mark T. Le
Attorney, Agent, or Firm—Leon Gilden

[57] ABSTRACT

An anti-jackknifing valve is designed for use with tractor trailers and is operably inserted in the hydraulic fluid brake line of such vehicles. The valve prevents jackknifing of a trailer during brake applications by initially actuating the brakes on the trailer. The valve arrangement directs hydraulic brake fluid to the trailer brakes first, and a continuing movement of the valve piston then permits hydraulic brake fluid to be delivered to the tractor brakes to thus substantially eliminate the risk of jackknifing.

3 Claims, 2 Drawing Sheets

ANTI-JACKNIFING VALVE

BACKGROUND OF THE INVENTION

1. Field of the Invention

The present invention relates to vehicle braking systems, and more particularly pertains to a new and improved valve assembly utilizable with hydrualic brakes which causes the brakes on a trailer to be applied prior to the application of the brakes on the pulling vehicle.

2. Description of the Prior Art

The jackknifing of tractor trailer trucks while braking is a well known and recognized problem, and various devices have been invented which are directed to overcoming this problem. Most prior art devices are constructed in the form of combined mechanical and hydraulic actuating systems which sense a jackknifing and which then operate to couteract the same through forces being applied by mechanical components that are hydraulically operated. These prior art device have met with limited success as evidenced by their lack of commercial availability, and typical examples of these prior devices are to be found in U.S. Pat. No. 4,455,035 which issued to Ivony et al on June 19, 1984; U.S. Pat. No. 4,556,231 which issued to R. Schultz on Dec. 3, 1985; and U.S. Pat. No. 4,585,248 which issued to Miller et al on Apr. 29, 1986.

As can be appreciated, tractor trailer rigs by law are required to have brakes on the trailers as well as on the tractors. It can be furtehr appreciated that a proper independent actuation of the various available braking systems on a tractor trailer rig could prevent jackknifing. For example, if a trailer could be stopped more quickly than a tractor, there would be less tendency for the heavy trailer to slide past the tractor during rapid braking. However, a system which allows braking forces to be applied to a trailer prior to a tractor does not appear to be commercially available and a need for such a system apparently exists. In this regard, the present invention substantially addresses this need.

SUMMARY OF THE INVENTION

In view of the foregoing disadvantages inherent in the known types of tractor trailer braking systems now present in the prior art, the present invention provides an improved tractor trailer braking system through the use of a hydraulic fluid control valve positionable in the brake lines, wherein braking fluid pressure is applied first to the trailer brakes and then subsequently to the tractor brakes. As such, the general purpose of the present invention, which will be described subseauently in greater detail, is to provide a new and improved tractor trailer braking system which has all the advantages of the prior art tractor trailer braking systems and none of the disadvantages.

To attain this, the present invention comprises a valve assembly which is positionable within the hydraulic fluid braking lines of a tractor having an attached trailer. The valve housing includes two brake fluid inlet lines and two brake fluid outlet lines. One outlet line is directed to the trailer brakes and the second outlet line is directed to the trailer brakes. When braking force is applied to the master cylinder, fluid pressure is applied to a double headed piston contained within the valve housing, and the piston is moved upwardly against the force of a spring contained therein. Initially, the second outlet line is open whereby fluid pressure is applied to the trailer brakes, and as the double piston continues its movement within the cylinder, the first oulet line is subsequently opened whereby fluid pressure is also directed to the tractor brakes. Accordingly, the trailer brakes are applied prior to the tractor brakes, thereby to offset the tendency of the tractor trailer to jackknife during a rapid braking operation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilling in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tractor trailer braking system which has all the advantaged of the prior art tractor trailer braking systems and none of the disadvantages.

It is another object of the present invention to provide a new and improved tractor trailer braking system which may be easily and efficiently manufactured and marketed.

It is a further object of the present invention to provide a new and improved tractor trailer braking system which is of a durable and reliable construction.

An even further object of the present invention is to provide a new and improved tractor trailer braking system which is susceptible of a low cost of manufacture with regard to both materials and labor, and which accordingly is then susceptible of low prices of sale to the consuming public, thereby making such tractor trailer braking systems economically available to the buying public.

Still yet another object of the present invention is to provide a new and improved tractor trailer braking system which provides in the apparatuses and method of the prior art some of the advantages thereof, while simultaneously overcoming some of the disadvantages normally associated therewith.

Still another object of the present invention is to provide a new and improved tractor trailer braking system wherein trailer brakes are applied prior to tractor brakes to prevent jackknifing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should had to the accompanying drawings and descriptive matter in which there is illustrated preferred embodiments of the invention.

BRIEF DESCRIPTION OF THE DRAWINGS

The invention will be better understood and objects other than those set forth above all become apparent when consideration is given to the following detailed description thereof. Such description makes reference to the annexed drawings wherein.

DESCRIPTION OF THE PREFERRED EMBODIMENT

Figure 1:
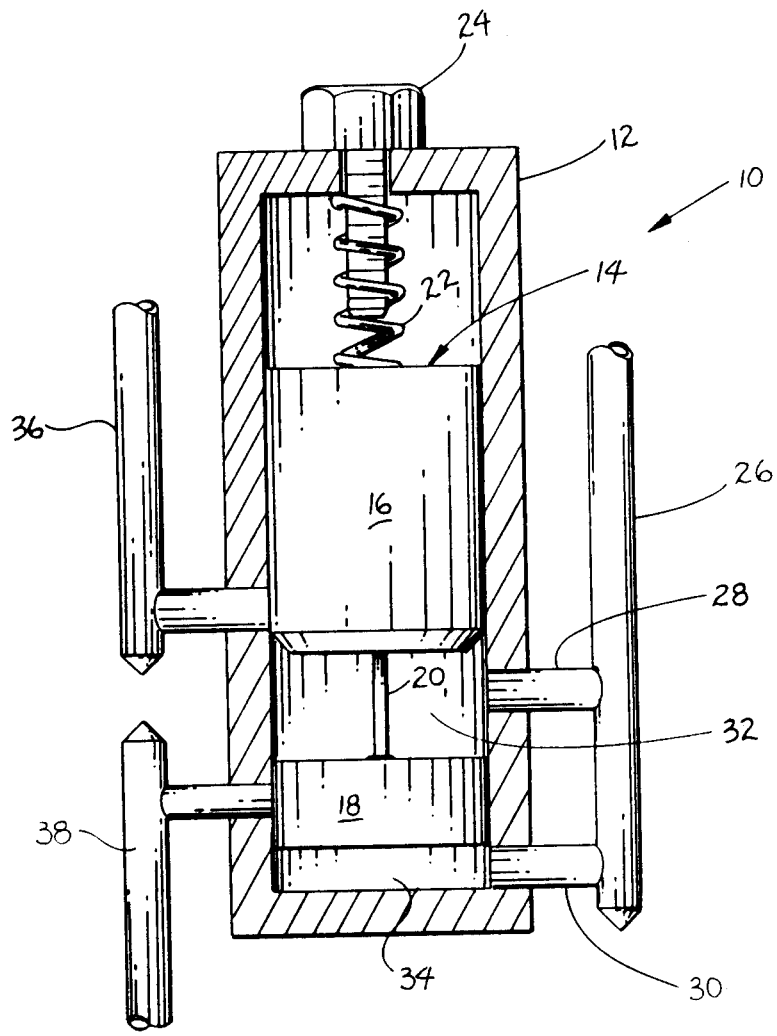
FIG. 1 is a detailed elevation view, partly in cross section, of the anti-jackknifing valve comprising the present invention.
Figure 2:
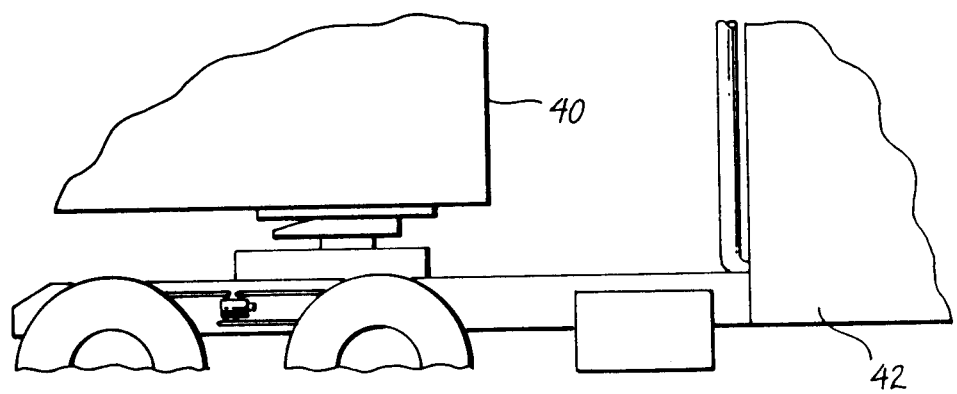
FIG. 2 is a partial side elevation view of a tractor trailer rig showing the present invention operably installed thereon.

With reference now to the drawings, and in particular to FIGS. 1 and 2 thereof, a new and improved anti-jackknifing valve embodying the principles and concepts of the present invention and generally designated by the reference numeral 10 will be described.

More specifically, it will be noted that the valve 10 essentially includes a cylinder housing 12 having a piston arrangement 14 slidably positioned therein. The piston arrangement 14 includes a first piston 16 positionable intermediately of the cylinder 12 and a second piston 18 positioned near a bottommost portion of the cylinder. The piston heads 16, 18 are fixedly secured together by a rod member 20 directed therebetween. The positioning of the piston heads 16, 18 within the cylinder 12 is controlled by a spring member 22 and the extent of upward travel of the interconnected piston heads is controlled by an adjustment screw 24 in a now apparent manner.

As best illustrated in FIG. 1, a brake fluid intake line 26 is directed from a vehicle's master cylinder and feeds into the cylinder 12 through a pair of branch conduits 28, 30. The conduit 28 facilitates the delivery of brake fluid to an interior empty chamber 32 within the cylinder 12, and the conduit 30 delivers fluid into a further normally empty chamber 34.

The drawings additionally illustrate a pair of further conduits 36, 38 which facilitate fluid movement through the valve 10. The conduit 36 is designed to receive brake fluid from the chamber 32 and direct the fluid to the brakes of a trailer 40, while the conduit 38 is designed to receive brake fluid from the chamber 34 and direct the same to the hydraulic brake cylinder associated with a tractor 42.

As to the manner of usage and operation of the present invention, reference is made to FIG. 1 of the drawings. In this regard, at the time of initial brake application by a tractor driver, the hydraulic fluid in conduit 26 is pressurized by such brake application and this pressure is transmitted to the fluid contained in the chambers 32, 34. At the time of initial brake application, it can be appreciated that the fluid pressure cannot be delivered to the trailer brakes due to the fact that the piston head 16 is blocking the conduit 36. Similarly, braking fluid pressure is not deliverable to the tractor brakes due to the fact that the piston head 18 is blocking conduit 38.

The delivery of fluid and pressurization thereof within the chamber 32 results in equal fluid pressures being applied upwardly against the piston head 16 and downwardly against the piston head 18, thereby to effect no movement of the piston assembly 14 within the cylinder 12. However, the concurrent pressurization of the fluid in chamber 34 results in an offsetting fluid pressure against a bottom surface of the piston head 18, thereby to result in an imbalance of forces so that the complete piston assembly 14 moves upwardly agains the biasing force of the spring 22. Almost immediately, piston head 16 begins opening the conduit 36 so that pressurized brake fluid is directed thereto. This of course results in an initial application of the brakes on the associated trailer 40. However, it will be noted that the concurrent upward movement of the piston head 18 does not result in an immediate opening of the conduit 38 so that the tractor brakes are still unapplied.

If the braking force is increased by the driver, the combined piston head 16, 18 will continue to move upwardly so as to supply even more pressurized fluid to the conduit 36 and at a preselected point, conduit 38 will begin to be exposed as piston head 18 uncovers the same. At this point, the brakes are now applied to the tractor 42 while the brakes are continually applied to the trailer 40. As such, the chances of jackknifing are substantially eliminated due to the fact that the trailer has been substantially slowed down before the brakes of the tractor 42 are applied.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved braking systems for a tractor having a first set of brakes and a trailer towed thereby having a second set of brakes, said system being designed to prevent jackknifing between said tractor and said trailer and essentially comprising a valve means which facilitates a selective controlling of pressurization and flow of hydraulic braking fluid to said first and second set of brakes in an independent manner, whereby said second set of brakes is applied prior to an application of force to said first set of brakes, and wherein said valve means includes a substantially fluid-tight housing means having a brake fluid delivery conduit in fluid communication therewith, a first brake fluid outflow conduit communication therewith and operably controlling said first set of brakes, and a second brake fluid outflow conduit in fluid communication therewith and operably controlling said second set of brakes, and further including a piston means slidably retained within said housing means and being movable in response to fluid pressure delivered through said brake fluid delivery conduit, said piston means serving to selectively open and close said first and second brake fluid outflow conduits, and wherein said piston means includes a first piston head and a second piston head spaced therefrom and fixedly secured thereto, said first piston head serving to control a delivery of fluid to said first brake fluid outflow conduit and second piston head serving to control a delivery of fluid to said second brake fluid outflow conduit.

2. The new and improved braking system for a tractor and trailer as described in claim 1, and further including a first brake fluid receiving chamber positioned between said first and second piston heads and a second brake fluid receiving chamber positioned on an opposed end of said second piston head, said brake fluid delivery conduit serving to deliver pressurized brake fluid to said first and second brake fluid receiving chambers, thereby to effect a slidable movement of said piston 3. The new and improved braking system for a tractor and trailer as described in claim 2, wherein said slidable movement of said piston means within said housing means results in said first piston head establishing fluid communication between first brake fluid outflow conduit and said first brake fluid receiving chamber prior to said second piston head establishing fluid communication between said second brake fluid outflow conduit and said second brake fluid receiving chamber, thereby to effect an actuation of said second set of brakes prior to an actuation of said first set of brakes.

* * * * *